United States Patent
Yao et al.

(10) Patent No.: US 9,647,845 B2
(45) Date of Patent: May 9, 2017

(54) KEY DOWNLOADING METHOD, MANAGEMENT METHOD, DOWNLOADING MANAGEMENT METHOD, DEVICE AND SYSTEM

(71) Applicant: Fujian LANDI Commercial Equipment Co., Ltd., Fujian (CN)

(72) Inventors: Chengyong Yao, Fujian (CN); Rongshou Peng, Fujian (CN); Luqiang Meng, Fujian (CN)

(73) Assignee: Fujian LANDI Commercial Equipment Co., Ltd, Fujian (CN)

( * ) Notice: Subject to any disclaimer, the term of this patent is extended or adjusted under 35 U.S.C. 154(b) by 7 days.

(21) Appl. No.: 14/777,260

(22) PCT Filed: Jan. 24, 2014

(86) PCT No.: PCT/CN2014/071299
§ 371 (c)(1),
(2) Date: Sep. 15, 2015

(87) PCT Pub. No.: WO2014/139344
PCT Pub. Date: Sep. 18, 2014

(65) Prior Publication Data
US 2016/0028548 A1 Jan. 28, 2016

(30) Foreign Application Priority Data
Mar. 15, 2013 (CN) .......................... 2013 1 0084671

(51) Int. Cl.
*G06F 21/00* (2013.01)
*H04L 9/32* (2006.01)
(Continued)

(52) U.S. Cl.
CPC .......... *H04L 9/3247* (2013.01); *H04L 9/0825* (2013.01); *H04L 9/0836* (2013.01);
(Continued)

(58) Field of Classification Search
CPC .................................. G06F 21/16; G06F 21/64
(Continued)

(56) References Cited

U.S. PATENT DOCUMENTS 9,215,223 B2 * 12/2015 Kirsch ................ H04L 63/0869

FOREIGN PATENT DOCUMENTS

| CA | 2 766 491 A1 | 12/2010 |
| CN | 102064939 A | 5/2011 |

(Continued)

OTHER PUBLICATIONS

International Search Report dated Apr. 30, 2014, issued to International Application No. PCT/CN2014/071299.

*Primary Examiner* — Anthony Brown
(74) *Attorney, Agent, or Firm* — Stein IP, LLC (57) ABSTRACT

Disclosed is a key download and management method, comprising: a device end authenticating the validity of an RKS server by checking the digital signature of a public key of an operating certificate of the RKS server; the RKS server generating an authentication token (AT); after being encrypted with a device identity authentication public key of the device end, returning a ciphertext to the device end; after being decrypted by the device end with a device identity authentication private key thereof, encrypting the ciphertext with the public key of the operating certificate and then returning same to a key server; after being decrypted with a private key of the operating certificate, the key server contrasting whether the decrypted authentication token (AT) is the same as the generated authentication token (AT); and if so, indicating that the POS terminal of a device is valid, thereby realizing bidirectional identity authentication.

6 Claims, 5 Drawing Sheets

(51) Int. Cl.
*H04L 29/06* (2006.01)
*H04L 9/08* (2006.01)
*H04L 9/30* (2006.01)

(52) U.S. Cl.
CPC .................. *H04L 9/30* (2013.01); *H04L 9/32* (2013.01); *H04L 9/3265* (2013.01); *H04L 63/062* (2013.01); *H04L 63/0807* (2013.01); *H04L 2209/24* (2013.01); *H04L 2209/56* (2013.01); *H04L 2209/72* (2013.01)

(58) Field of Classification Search
USPC ........................................................ 713/176
See application file for complete search history.

(56) References Cited

FOREIGN PATENT DOCUMENTS

| | | |
|---|---|---|
| CN | 102624710 A | 8/2012 |
| CN | 102957541 A | 3/2013 |
| CN | 103220270 A | 7/2013 |

\* cited by examiner

KEY DOWNLOADING METHOD, MANAGEMENT METHOD, DOWNLOADING MANAGEMENT METHOD, DEVICE AND SYSTEM

CROSS-REFERENCE TO RELATED APPLICATIONS

This application is a national stage of International Application No. PCT/CN2014/071299, filed Jan. 24, 2014, which claims the benefit of priority to Chinese Application No. 201310084671.6, filed Mar. 15, 2013, in the State Intellectual Property Office, the disclosures of which are incorporated herein by reference.

TECHNICAL FIELD

The present invention relates to the field of electronic payment, in particular to a key downloading method, management method, downloading management method, device, and system.

DESCRIPTION OF THE RELATED ART

Bank cards as a payment tool have become more and more popular. Usually, a bank card payment system includes a POS terminal (Point of Sales), a TMS (Terminal ManageSystem), a PIN PAD, and a HSM (Hardware and Security Module). Wherein, the POS terminal is a device which can receive the bank card information, has a communication function, and receives the teller's order to complete the financial transaction information and the related information exchange; the TMS system is a system of centralized management and transaction handling that performs centralized management on the POS terminal, including parameter downloading, key downloading, receiving, handling or transferring of transaction request of the POS terminal, and feeds back the trading result information to the POS terminal; the PIN PAD is a security device for securely storing and protecting various keys related to the financial transactions, and encrypting the PIN for protection; the hardware and security module (HSM) is a peripheral hardware device for encrypting the transmitted data, used to encrypt and decrypt the PIN, verify the correctness of the messages and documents, and store keys. A PIN (Personal Identification Number), namely a personal PIN, is data information for identifying the validity of the identity of the card holder in on-line transaction, which is not allowed to be shown as a clear text in any link of the computer and network system; a TMK (Terminal Master Key) is a master key for encrypting the working keys when the POS terminal works, which is stored in the database, can be used only and cannot be read. The POS terminal is widely applied to bank card payment occasions, for example, malls and hotels, and is an indispensable modern payment means which is seen everywhere in daily life. Bank cards, in particular debit cards, are usually set with a PIN by card holders. In the process of payment, the POS terminal uploads the magnetic track information of the bank card and also needs the PIN so that the issuing bank can verify the validity of the identification of the card holder, thus ensuring the payment security of the bank card and protecting the property security of the card holder. To prevent the PIN from being disclosed or being decrypted, it is required that the PIN is encrypted throughout the whole information interaction process from the terminal to the issuing bank. The PIN is not allowed to be shown as a clear text in any link of the computer network system. Therefore, all POS terminals that receive PIN inputs are required to be configured with the key management system.

The key system of the POS terminal is classified into two levels: terminal master key (TMK) and working key (WK). Wherein, the TMK encrypts and protects the WK in the updating process of the MK. Every POS terminal shares an exclusive TMK with the TMS and must be provided with security protection to ensure that the TMK can only be written into the device and participate in the calculation and cannot be read; TMK is a critical root key; if the TMK is intercepted, the working key is easily cracked, which seriously endangers the payment security of the bank card. Whether the TMK can be securely downloaded into the POS terminal is critical to the security of the whole POS terminal. The following are existing TMK downloading methods:

1. Manual text clear input solution: the TMS generates the TMK clear text, directly manually input into the PIN PAD of the POS terminal. Such solution has a very big security hole; the operator easily intercepts the TMK clear text; a manual input error is possible; a great number of devices need input of the corresponding TMKs one by one; usually to enhance the security, the TMK varies with the POS, thus generating complicated and huge management costs and workloads.

2. IC card cipher text import solution: IC card cipher text import. The TMK is stored in the IC card after being generated by the TMS. The IC card holder sets the PIN to protect the TMK in the IC card. When the TMK is imported into the POS terminal, the TMK is imported into the PIN PAD after the PIN is entered through the PIN PAD of the POS terminal. For this solution, management personnel are required to insert the IC cards and set the PIN one by one when the TMS generates the POS terminal. To import the TMK into the POS terminal, it is also needed to manually enter the PIN. PIN leakage still may result in leakage of the TMK. Besides, huge management costs and workloads are generated when a great number of POSs employ such solution.

3. Local key parent POS solution: In the current payment industry, a local key downloading means is usually employed, and the master keys downloaded to the financial POS terminal must be downloaded locally to ensure secure downloading, which means that the financial POS terminals need moving to the security machine room of the management center to be physically connected with the key parent POS in the security machine room, they download the master key from the key parent POS through the operation of the management personnel, and then distribute it to the deployed sites, and then remotely download the working keys through the master keys.

The above three solutions all have the following defects. The devices are needed to be moved to the security machine room of the management center to manually download the keys in a concentrated way. The machine room of the maintenance center bears a huge workload; the devices need moving to the security room of the management center to download the keys after delivery and then distribute them to the merchants, so the transport cost rises. To download the keys concentratedly, a great amount of labor and working time are needed; the maintenance cost is high; and the maintenance cycle is long.

At present, a remote key downloading solution is provided: the TMS system calls the HSM to generate a pair of public and private keys; the POS terminal calls the PIN PAD to randomly generate the TMK, encrypts the TMK by using the public key of the TMS and transmits the encrypted TMK to the TMS; the TMS calls the HSM, decrypts the TMK by using the private key, stores the decrypted TMK, encrypts the working key by using the TMK and then downloads it to the POS terminal. This solution has the following defects: the TMS cannot identify the identification of the POS terminal and prevent the fake terminal from connecting to the TMS to download the TMK; the POS terminal cannot identify the identification of the TMS and prevent the fake TMS background from downloading the fake TMK.

Contents of the Present Invention

To solve the above mentioned problems, the present invention adopts the following technical solutions:

A key downloading method is provided, comprising the steps of: sending a device sequence number DSN and a device identity authentication request to an RKS server via a device terminal; receiving a working certificate public key RKS_WCRT_PK and a cipher text AT_TK1 sent by the RKS server, via the device terminal, wherein the cipher text AT_TK1 is obtained by encrypting an authentication token AT and the first transmission key component TK1 by using a device identity authentication pubic key DIK_PK; verifying if the digital signature of the RKS_WCRT_PK is valid by using a root public key certificate RKS_RCRT, and if valid, decrypting the cipher text AT_TK1 by using a device identity authentication private key DIK_SK to obtain clear texts AT and TK1, via the device terminal, wherein DIK_PK and DIK_SK are a non-symmetric key pair; generating the third random number as the second transmission key component TK2, performing XOR on TK1 and TK2 to obtain a transmission key TK, calculating the SHA256 verification value of the TK to obtain TK_SHA2 via the device terminal; encrypting AT, TK2, and TK_SHA2 by using RKS_WCRT_PK to obtain a cipher text AT_TK2_TK_SHA2 and sending the cipher text AT_TK2_TK_SHA2 to the RKS server, via the device terminal; receiving a key cipher text sent by the RKS server via the device terminal, wherein the key cipher text is obtained through encrypting the key to be downloaded by TK; decrypting the key cipher text by using TK to obtain a key clear text, storing the key in a security module, via the device terminal; judging if the key downloading is complete, and if complete, clearing the AT, TK, and RKS_WCRT_PK, by using the device terminal.

Another technical solution adopted by the present invention is as follows:

A key management method is provided, comprising the steps of: receiving a device sequence number DSN and a device identity authentication request sent from at least one device terminal by an RKS server; taking the DSN as an index to read the corresponding device identity authentication public key DIK_PK from the device identity authentication public key database by the RKS server; generating a 24-byte first random number as an authentication token AT and generating a second random number as a first transmission key component TK1 by the RKS server; encrypting AT and TK1 by using DIK_PK to obtain a cipher text AT_TK1 by the RKS server; sending a working certificate public key RKS_WCRT_PK and the cipher text AT_TK1 to the device terminal by the RKS server; receiving a cipher text AT_TK2_TK_SHA2 sent from the device terminal by the RKS server, wherein the cipher text AT_TK2_TK_SHA2 is obtained through encrypting AT, the second transmission key component TK2 and TK_SHA2 by the RKS_WCRT_PK, TK_SHA2 is the SHA256 verification value of the transmission key TK, TK is obtained through performing XOR on TK1 and TK2; decrypting the cipher text AT_TK2_TK_SHA2 by using the working certificate private key to obtain clear texts AT, TK2 and TK_SHA2 by the RKS server, wherein RKS_WCRT_PK and RKS_W-CRT_SK form a non-symmetric key pair; judging if the received AT is equal to the sent AT, and if so, performing XOR on TK1 and TK2 to obtain TK, calculating the SHA256 verification value of TK to obtain TK_256, by the RKS server; judging if TK_256 is equal to the received TK_SHA2, and if so, encrypting the key required to be downloaded by using TK to obtain the key cipher text, by the RKS server; sending the key cipher text to the device terminal by the RKS server; and clearing AT and TK by the RKS server to complete the key downloading process.

Another technical solution adopted by the present invention is as follows:

A key downloading management method is provided, comprising the steps of: sending a device sequence number DSN and a device identity authentication request by a device terminal by to an RKS server; taking the DSN as an index to read the corresponding device identity authentication public key DIK_PK from the device identity authentication public key database by the RKS server; generating a 24-byte first random number as an authentication token AT and generating a second random number as a first transmission key component TK1 by the RKS server; encrypting AT and TK1 by using DIK_PK to obtain a cipher text AT_TK1 by the RKS server; sending a working certificate public key RKS_WCRT_PK and the cipher text AT_TK1 to the device terminal by the RKS server; verifying if the digital signature of RKS_WCRT_PK is valid by using the root public key certificate RKS_RCRT, and if so, decrypting the cipher text AT_TK1 to obtain clear texts AT and TK1 by using the device identity private key DIK_SK, via the device terminal, wherein DIK_PK and DIK_SK form a non-symmetric key pair; generating the third random number as the second transmission key component TK2, performing XOR on TK1 and TK2 to obtain a transmission key TK, calculating the SHA256 verification value of TK to obtain TK_SHA2, via the device terminal; encrypting AT, TK2, and TK_SHA2 by using RKS_WCRT_PK to obtain a cipher text AT and sending the cipher text AT_TK2_TK_SHA2 to the RKS server, via the device terminal; decrypting the cipher text AT_TK2_TK_SHA2 by using the working certificate private key RKS_WCRT_SK to obtain clear texts AT, TK2, and TK_SHA2 by the RKS server, wherein RKS_WCRT_PK and RKS_WCRT_SK form a non-symmetric key pair; judging if the received AT is equal to the sent AT, and if so performing XOR on TK1 and TKS2 to obtain TK, calculating the SHA256 verification value of TK to obtain TK_256, judging if TK_256 is equal to the received TK_SHA2, and if so, encrypting the key required to be downloaded by using TK to obtain the key cipher text and sending the key cipher text to the device terminal, by the RKS server; decrypting the key cipher text by using TK to obtain a key clear text, and storing the key into a security module, via the device terminal; judging if the key downloading is complete, and if so, clearing AT, TK, and RKS_WCRT_PK, via the device terminal; clearing AT and TK by the RKS server to complete the key downloading process.

Another technical solution adopted by the present invention is as follows:

A key downloading device is provided, comprising: an authentication request sending unit for sending a device sequence number DSN and a device identity authentication request to an RKS server; a first receiving unit for receiving a working certificate public key RKS_WCRT_PK and a cipher text AT_TK1 sent by the RKS server, wherein the cipher text AT_TK1 is obtained by encrypting an authentication token AT and the first transmission key component TK1 by using a device identity authentication pubic key DIK_PK; a server identity verifying unit for verifying if the digital signature of RKS_WCRT_PK is valid by using a root public key certificate RKS_RCRT; a first decrypting unit for decrypting the cipher text AT_TK1 by using a device identity authentication private key DIK_SK to obtain clear texts AT and TK1 when the server identity verifying unit verifies that the digital signature is valid, wherein DIK_PK and DIK_SK form a non-symmetric key pair; a second transmission key component generating unit for generating a third random number as the second transmission key component TK2; a first transmission key computation unit for performing XOR on TK1 and TK2 to obtain a transmission key TK and calculating SHA256 verification value of TK to obtain TK_SHA2; a first encrypting unit for encrypting AT, TK2 and TK_SHA2 by using RKS_WCRT_PK to obtain a cipher text AT_TK2_TK_SHA2; a first sending unit for sending the cipher text AT_TK2_TK_SHA2 to the RKS server; a second receiving unit for receiving a key cipher text sent by the RKS server, wherein the key cipher text is obtained through encrypting the key to be downloaded by TK; a second decrypting unit for decrypting the key cipher text by using TK to obtain a key clear text; a key downloading unit for storing the key in a security module; a first clearing unit for judging if the key downloading is complete, and when the downloading is complete, clearing AT, TK, and RKS_WCRT_PK.

Another technical solution adopted by the present invention is as follows:

A key management device is provided, comprising: an authentication request receiving unit for receiving a device sequence number DSN and a device identity authentication request sent from at least one device terminal; a device identity authentication unit for taking the DSN as an index to read the corresponding device identity authentication public key DIK_PK from the device identity authentication public key database; an authentication token generating unit for generating a 24-byte first random number as the authentication token AT; a first transmission key generating unit for generating a second random number as a first transmission key component TK1; a second encrypting unit for encrypting AT and TK1 by using DIK_PK to obtain a cipher text AT_TK1; a second sending unit for sending a working certificate public key RKS_WCRT_PK and the cipher text AT_TK1 to the device terminal; a third receiving unit for receiving a cipher text AT_TK2_TK_SHA2 sent from the device terminal, wherein the cipher text AT_TK2_TK_SHA2 is obtained through encrypting AT, the second transmission key component TK2 and TK_SHA2 by the RKS_WCRT_PK, TK_SHA2 is the SHA256 verification value of the transmission key TK, TK is obtained through performing XOR on TK1 and TK2; a third decrypting unit for decrypting the cipher text AT_TK2_TK_SHA2 by using the working certificate private key to obtain clear texts AT, TK2, and TK_SHA2, wherein RKS_WCRT_PK and RKS_WCRT_SK form a non-symmetric key pair; an authentication token verifying unit for judging if the received AT is equal to the sent AT; a second transmission key computation unit for performing XOR on TK1 and TK2 to obtain TK when judging that the received AT is equal to the sent AT, and calculating the SHA256 verification value of TK to obtain TK_256; a transmission key verifying unit for judging if the TK_256 generated by the second transmission key computation unit is equal to the received TK_SHA2; a third encrypting unit for encrypting the key required to be downloaded by using TK to obtain the key cipher text when the transmission key verifying unit judges that the TK_256 generated by the second transmission key computation unit is equal to the received TK_SHA2; a third sending unit for sending the key cipher text to the device terminal; and a second clearing unit for clearing AT and TK to complete the key downloading process.

Another technical solution adopted by the present invention is as follows:

A key downloading management system is provided, comprising an RKS server and at least one device terminal in communication connection with the RKS server; the RKS server comprises a key management device as mentioned above; and the device terminals include the key downloading device as mentioned above.

The key downloading method, management method, downloading management method, device, and system of the present invention realize that the device terminal remotely downloads the master keys from the RKS server, thus avoiding a situation where the device terminal needs to download the master keys in a concentrated way and then releases the master keys to the merchants; after delivery, the device terminals can be directly distributed to the deployed sites, avoiding a situation where the device terminals need to be concentrated into a certain fixed machine room to download the keys and then distribute them to the deployed sites.

DESCRIPTION OF THE MAIN COMPONENTS

Device terminal 1; key downloading device 10; RKS server 3; key management device 30;
authentication request sending unit 11; first receiving unit 12; server identity verifying unit 13;
first decrypting unit 14; second transmission key component generating unit 15;
first transmission key computation unit 16; first encrypting unit 17; first sending unit 18;
second receiving unit 19; second decrypting unit 20; key downloading unit 21; first clearing unit 22;
authentication request receiving unit 31; device identity authentication unit 32; authentication token generating unit 33;
first transmission key generating unit 34; second encrypting unit 35; second sending unit 36;
third receiving unit 37; third decrypting unit 38; authentication token verifying unit 39;
second transmission key computation unit 40; transmission key verifying unit 41;
third encrypting unit 42; third sending unit 43; second clearing unit 44.

DETAILED DESCRIPTION OF THE PRESENT INVENTION

The technical contents, structural characteristics, fulfilled objectives, and effects of the present invention are described in detail with reference to the embodiments and attached drawings.

The definitions of the abbreviations and key terms involved in the present invention are described first:

Symmetric key: both data sending and receiving parties must have identical keys to perform encryption and decryption algorithms on the clear text. Symmetric key encryption algorithms mainly include: DES, 3DES, IDEA, FEAL, BLOWFISH.

Non-symmetric keys: Non-symmetric encryption algorithms need two keys: public key and private key. The public key and the private key are a pair. If the data is encrypted by using the public key, then the corresponding private key can implement the decryption; if the data is encrypted by the private key, then only the corresponding public key can implement the decryption. Two different keys are used to implement the encryption and decryption, so such algorithm is also called a non-symmetric encryption algorithm. The basic process where the non-symmetric encryption algorithm realizes exchange of the confidential information is as follows: Party A generates a pair of keys and discloses one of the keys as the public key to the other parties; Part B receives the public key and uses the key to encrypt the confidential information and then sends the encrypted information to Party A; Party B uses another exclusive key to decrypt the encrypted information. Party A can encrypt the confidential information by using the public key of Party B and then sends the encrypted information to Party B; then, Party B decrypts the encrypted information by using its own private key. Main algorithms include: RSA, Elgamal, knapsack algorithm, Rabin, D-H, ECC (Elliptic Curve Cryptography).

Digital signature: application of the non-symmetric key encryption technology and digital digest technology. Digital signature technology is to encrypt the digest message by using the private key of the sender and then send the encrypted digest together with the original text to the receiver. The receiver can decrypt the encrypted digest message by using the sent public key only to generate a digest message to the received original text, and then compares the generated digest message with the decrypted digest message. If the two messages are the same, this means that the received message is complete and is not modified during transmission; and if the two messages are different, this means that the message has been modified, so digital signature can verify the integrity and validity of the message. The digital signing is an encryption process, while digital signature verification is a decryption process.

RSA: a non-symmetric key algorithm The RSA public key encryption algorithm was crated by Ron Rivest, Adi Shamirh, and Len Adleman (Massachusetts Institute of Technology). RSA is named after the names of the three inventors. RSA is the most powerful public key encryption algorithm at present. It can resist all known PIN attacks, and has been recommended as the encryption standard for public key data by the ISO. The RSA algorithm is based on a very simple fact of number theory: it is very easy to multiply two big prime numbers. The RSA algorithm is the first algorithm capable of being used for encryption and digital signing at the same time, easy to understand and operate. RSA is the public key algorithm mostly widely researched, experiencing various attacks in more than 30 years since it was put forward. Now, RSA has been gradually accepted and is generally known as the most optimal public key solution at present.

TDES Triple-DES: DES is a kind of symmetric encryption algorithm, and the key includes 8 bytes. TDES is a DES-based encryption algorithm, and its key includes 16 bytes or 24 bytes. TDES/3DES is the abbreviation of Triple DES (namely triple Data Encryption Standard). DES is the abbreviation of Data Encryption Standard. DES is a symmetric key encryption algorithm, which means that the data encryption algorithm and the data decryption algorithm are the same. DES was developed and disclosed by IBM in the 70s of the 20th century, then adopted by the US government, and acknowledged by the American National Standards Institute (ANSI). TDES/3DES is a mode of DES encryption algorithm, using three 64-bit keys to encrypt the data three times. It is a more secure transformation of DES.

Figure 1:
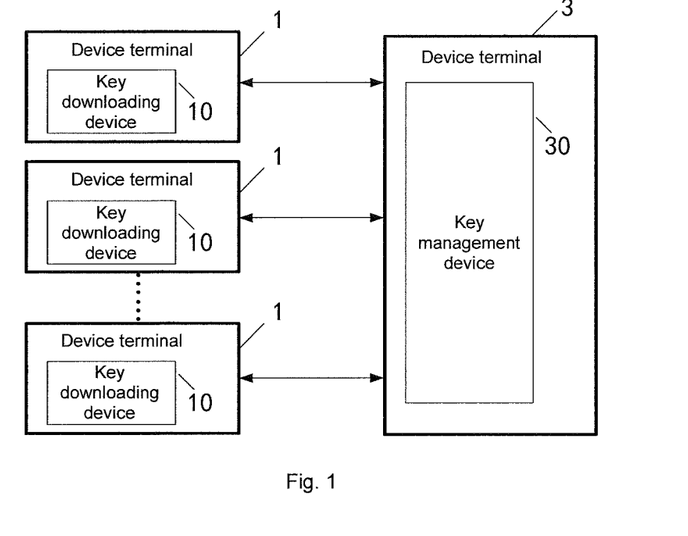
FIG. 1 is a structural diagram of a key downloading management system in embodiment 1 of the present invention.

Refer to FIG. 1, which is a structure diagram of the key downloading management system in embodiment 1 of the present invention. The key downloading management system comprises an RKS server 3 and at least one device terminal 1 in communication connection with the RKS server 3; the RKS server 3 comprises a key management device 30; the device terminal 1 comprises a key downloading device 10; the device terminal 1 is a POS terminal; the RKS server 3 is a remote key server, located in the machine room of the management center, responsible for generation and maintenance of the keys such as the master key and working key of the POS terminal; the RKS server 3 comprises a key database, namely the mater key database or working key database of the POS terminal, here representing the TMK database downloaded remotely, and usually a special hardware and security module generates the key database and stores the keys.

Figure 2:
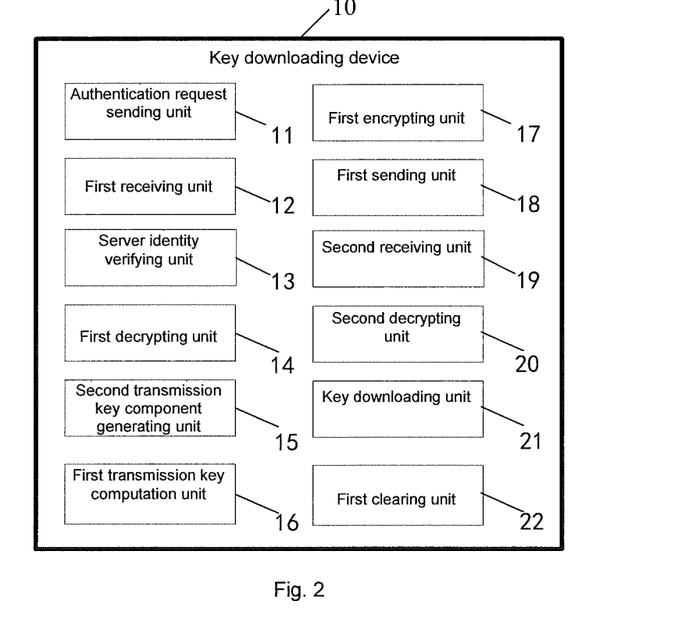
FIG. 2 is a structural diagram of a key downloading device in embodiment 1 of the present invention.

Refer to FIG. 2, which is a structural diagram of a key downloading device in embodiment 1 of the present invention. A key downloading device 10 comprises an authentication request sending unit 11, a first receiving unit 12, a server identity verifying unit 13, a first decrypting unit 14, a second transmission key component generating unit 15, a first transmission key computation unit 16, a first encrypting unit 17, a first sending unit 18, a second receiving unit 19, a second decrypting unit 20, a key downloading unit 21 and a first clearing unit 22.

The authentication request sending unit 11 is used to send the device sequence number DSN and the device identity authentication request to the RKS server, wherein the DSM corresponds to the device terminal 1 one by one; the first receiving unit 12 is used to receive the working certificate public key RKS_WCRT_PK and the cipher text AT_TK1 sent by the RKS server 3; the cipher text AT_TK1 is obtained through encrypting the authentication token AT and the first transmission key component TK1 by the device identity authentication public key DIK_PK, wherein RKS_WCRT_PK comprises a digital signature thereof made by the root private key certificate RKS_RCRT_SK, thus ensuring that the RKS_WCRT_PK is valid and cannot be faked. The working certificate RKS_WCRT is a pair of non-symmetric keys; in case of RSA keys, the minimum digits are 2048; the working certificate RKS_WCRT consists of the working certificate public key RKS_WCRT_PK and the working certificate private key RKS_WCRT_SK; RKS_WCRT is required to be stored in a security media, for example, statically stored in an IC card as a backup and then imported into the security storage media of the RKS3.

The server identity verifying unit 13 is used for verifying if the digital signature of RKS_WCRT_PK is valid by using the root public key certificate RKS_RCRT_PK, wherein, RKS_RCRT_PK is pre-installed in the firmware when the device terminal 1 is delivered; the key server root certificate RKS_RCRT has a pair of non-symmetric keys; in the case of RSA key, the minimum digits are 2048; RKS_RCRT consists of a root public key certificate RKS_RCRT_PK and the root private key certificate RKS_RCRT_SK; and RKS_RCRT_PK is used to verify the validity of RKS_WCRT_PK. RKS_RCRT_SK is used to generate the digital signature to sign RKS_WCRT_PK. RKS_RCRT needs to be stored in secure media; the root private key certificate RKS_RCRT_SK requires strict protection, can be stored in the IC card, and can only be used for signing the working certificate public key RKS_WCRT_PK.

The first decrypting unit 14 is used for decrypting the cipher text AT_TK1 by using the device identity authentication private key DIK_SK to obtain the clear texts AT and TK1 when the server identity verifying unit 13 verifies that the digital signature is valid; the device identity authentication key pair DIK is a non-symmetric key pair, consisting of DIK_PK and DIK_SK; the key pair is randomly generated in the device terminal 1, or generated by an external key generator in a secure environment and then guided into the device terminal; DIK_PK is exported from the device terminal 1 or exported from the special key generator after delivery of the device terminal, and taking the DSN as the index, together with the corresponding DSN stored in the device identity authentication public key database of the RKS server 3; and DIK_PK is a public key, capable of being transmitted as a clear text, for example, DIK_PK can be transmitted through email or other convenient means. DIK_SK is stored in the security media of the device terminal 1, and the device terminal 1 has an anti-attack mechanism, ensuring that DIK_SK is destroyed immediately after being attacked. Wherein, DIK_PK and DIK_SK are non-symmetric keys, for example RSA, Elgamal, knapsack algorithm, Rabin, D-H, or ECC (Elliptic Curve Cryptograph). In this embodiment, DIK_PK and DIK_SK are RSA key pair.

The second transmission key component generating unit 15 is used for generating a third random number as the second transmission key component TK2; the first transmission key computation unit 16 is used for performing XOR on TK1 and TK2 to obtain a transmission key TK and calculating the SHA256 verification value of TK to obtain TK_SHA2; the first encrypting unit 17 is used for encrypting AT, TK2, and TK_SHA2 by using RKS_WCRT_PK to obtain a cipher text AT_TK2_TK_SHA2; the first sending unit 18 is used for sending the cipher text AT_TK2_TK_SHA2 to the RKS server 3; the second receiving unit 19 is used for receiving a key cipher text sent by the RKS server 3, wherein the key cipher text is obtained through encrypting the key to be downloaded by TK; the second decrypting unit 20 is used for decrypting the key cipher text by using TK to obtain a key clear text; the key downloading unit 21 is used for storing the key in a security module; the first clearing unit 22 is used for judging if the key download is complete, and when the download is complete, clearing AT, TK, and RKS_WCRT_PK.

Figure 3:
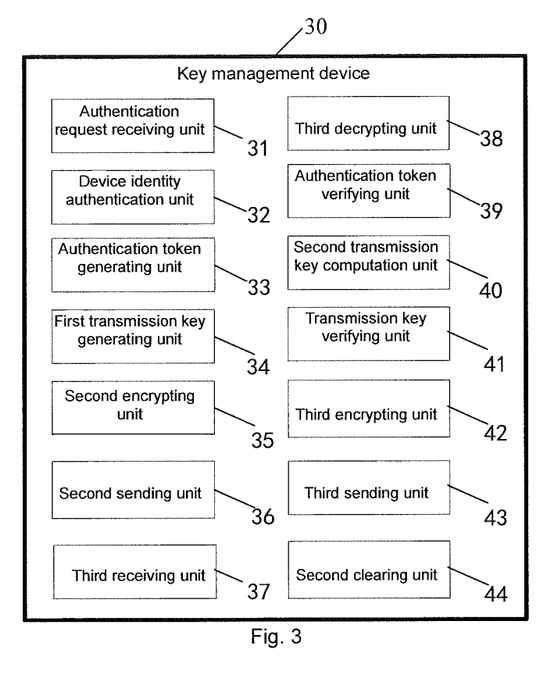
FIG. 3 is a structural diagram of a key management device in embodiment 1 of the present invention.

Refer to FIG. 3, which is a structure diagram of a key management device in embodiment 1 of the present invention. A key management device 30 comprises an authentication request receiving unit 31, a device identity authentication unit 32, an authentication token generating unit 33, a first transmission key generating unit 34, a second encrypting unit 35, a second sending unit 36, a third receiving unit 37, a third decrypting unit 38, an authentication token verifying unit 39, a second transmission key computation unit 40, a transmission key verifying unit 41, a third encrypting unit 42, a third sending unit 43, and a second clearing unit 44.

The authentication request receiving unit 31 is used for receiving a device sequence number DSN and a device identity authentication request sent from at least one device terminal 1. The device identity authentication unit 32 is used for taking the DSN as an index to read the corresponding device identity authentication public key DIK_PK from the device identity authentication public key database. The authentication token generating unit 33 is used for generating a 24-byte first random number as the authentication token AT. The first transmission key generating unit 34 is used for generating a second random number as a first transmission key component TK1. The second encrypting unit 35 is used for encrypting AT and TK1 by using DIK_PK to obtain a cipher text AT_TK1. The second sending unit 36 is used for sending a working certificate public key RKS_WCRT_PK and the cipher text AT_TK1 to the device terminal. The third receiving unit 37 is used for receiving a cipher text AT_TK2_TK_SHA2 sent from the device terminal 1, wherein the cipher text AT_TK2_TK_SHA2 is obtained through encrypting AT, the second transmission key component TK2, and TK_SHA2 by the RKS_WCRT_PK, TK_SHA2 is the SHA256 verification value of the transmission key TK, TK is obtained through performing XOR on TK1 and TK2. The third decrypting unit 38 is used for decrypting the cipher text AT_TK2_TK_SHA2 by using the working certificate private key to obtain clear texts AT, TK2, and TK_SHA2, wherein RKS_WCRT_PK and RKS_WCRT_SK form a non-symmetric key pair. The authentication token verifying unit 39 is used for judging if the received AT is equal to the sent AT. The second transmission key computation unit 40 is used for performing XOR on TK1 and TK2 to obtain TK when judging that the received AT is equal to the sent AT, and calculating the SHA256 verification value of TK to obtain TK_256. The transmission key verifying unit 41 is used for judging if TK_256 generated by the second transmission key computation unit 40 is equal to the received TK_SHA2. The third encrypting unit 42 is used for encrypting the key required to be downloaded by using TK to obtain the key cipher text when the transmission key verifying unit 41 judges that the TK_256 generated by the second transmission key computation unit is equal to the received TK_SHA2. The third sending unit 43 is used for sending the key cipher text to the device terminal. The second clearing unit 44 is used for clearing AT and TK to complete the key downloading process.

Figure 4:
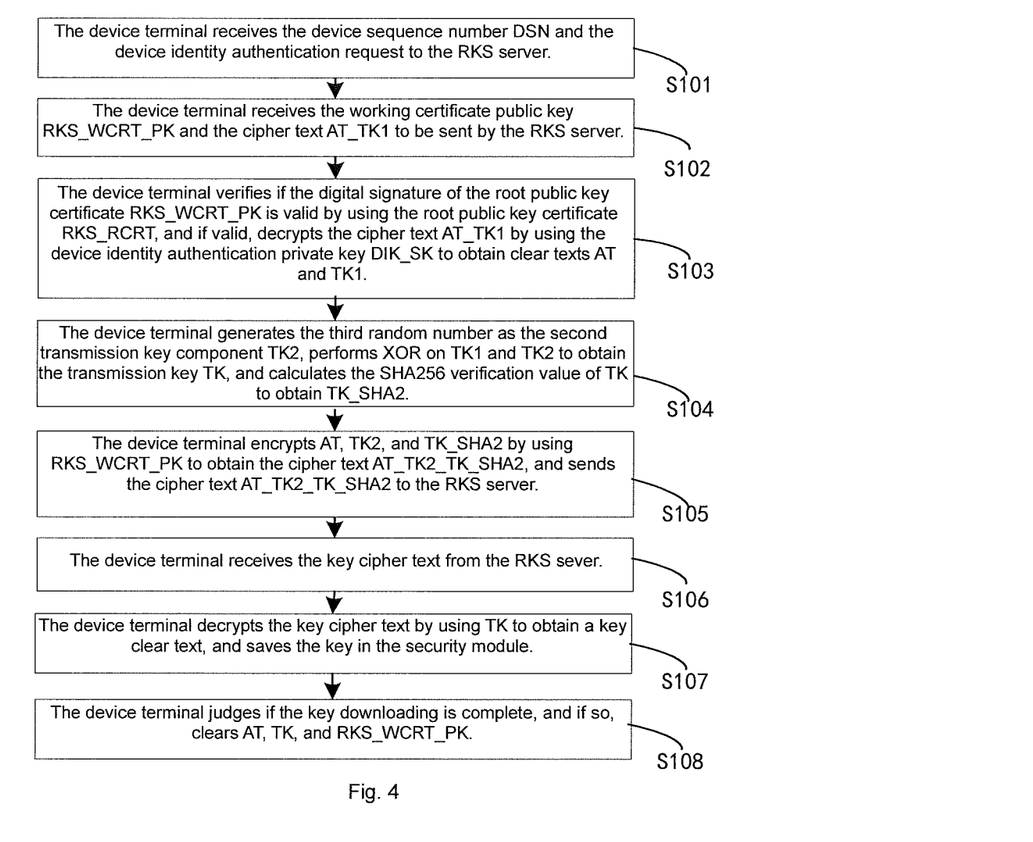
FIG. 4 is a flowchart of a key downloading method in embodiment 1 of the present invention.

Refer to FIG. 4, which is a flowchart of a key downloading method in embodiment 1 of the present invention. The key downloading method operates in the device terminal 1. The method is carried out as follows:

Step S101. The device terminal receives the device sequence number DSN and the device identity authentication request to the RKS server.

Step S102. The device terminal receives the working certificate public key RKS_WCRT_PK and the cipher text AT_TK1 sent by the RKS server; and the cipher text AT_TK1 is obtained through encrypting the authentication token AT and the first transmission key component TK1 by the device identity authentication public key DIK_PK.

Step S103. The device terminal verifies if the digital signature of the root public key certificate RKS_WCRT_PK is valid by using the root public key certificate RKS_RCRT, and if valid, decrypts the cipher text AT_TK1 by using the device identity authentication private key DIK_SK to obtain clear texts AT and TK1, wherein DIK_PK and DIK_SK form a non-symmetric key pair.

Step S104. The device terminal generates the third random number as the second transmission key component TK2, performs XOR on TK1 and TK2 to obtain the transmission key TK, and calculates the SHA256 verification value of TK to obtain TK_SHA2.

Step S105. The device terminal encrypts AT, TK2, and TK_SHA2 by using RKS_WCRT_PK to obtain the cipher text AT_TK2_TK_SHA2, and sends the cipher text AT_TK2_TK_SHA2 to the RKS server.

Step S106. The device terminal receives the key cipher text from the RKS sever, and the key cipher text is obtained through encrypting the key required to be downloaded by TK.

Step S107. The device terminal decrypts the key cipher text by using TK to obtain a key clear text, and saves the key in the security module.

Step S108. The device terminal judges if the key downloading is complete, and if so, clears AT, TK, and RKS_WCRT_PK.

Figure 5:
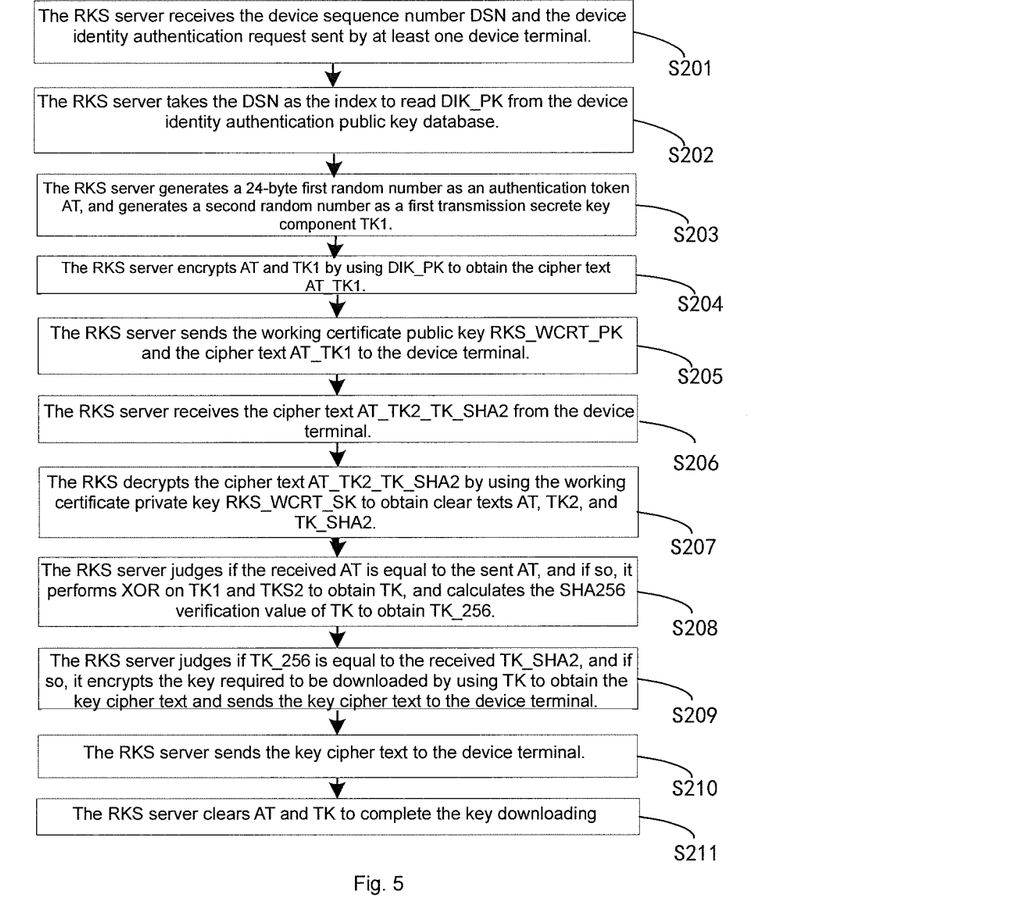
FIG. 5 is a flowchart of a key management method in embodiment 1 of the present invention.

Refer to FIG. 5, which is a flowchart of a key management method in embodiment of the present invention. The key management method operates in the RKS server 3. The method comprises:

Step S201. The RKS server receives the device sequence number DSN and the device identity authentication request sent by at least device terminal.

Step 202. The RKS server takes the DSN as the index to read the corresponding device identity authentication public key DIK_PK from the device identity authentication public key database.

Step 203. The RKS server generates a 24-byte first random number as an authentication token AT, and generates a second random number as a first transmission secrete key component TK1.

Step 204. The RKS server encrypts AT and TK1 by using DIK_PK to obtain the cipher text AT_TK1.

Step S205. The RKS server sends the working certificate public key RKS_WCRT_PK and the cipher text AT_TK1 to the device terminal.

Step S206. The RKS receives the cipher text AT_TK2_TK_SHA2 sent from the device terminal, wherein the cipher text AT_TK2_TK_SHA2 is obtained through encrypting AT, the second transmission key component TK2, and TK_SHA2 via the RKS_WCRT_PK; TK_SHA2 is the SHA256 verification value of the transmission key TK; TK is obtained through performing XOR on TK1 and TK2.

Step S207. The RKS decrypts the cipher text AT_TK2_TK_SHA2 by using the working certificate private key RKS_WCRT_SK to obtain clear texts AT, TK2 and TK_SHA2, wherein RKS_WCRT_PK and RKS_WCRT_SK form a non-symmetric key pair.

Step S208. The RKS server judges if the received AT is equal to the sent AT, and if so, it performs XOR on TK1 and TKS2 to obtain TK, and calculates the SHA256 verification value of TK to obtain TK_256.

Step S209. The RKS server judges if TK_256 is equal to the received TK_SHA2, and if so, it encrypts the key required to be downloaded by using TK to obtain the key cipher text and sends the key cipher text to the device terminal.

Step S210. The RKS server sends the key cipher text to the device terminal.

Step S211. The RKS server clears AT and TK to complete the key downloading process.

Figure 6:
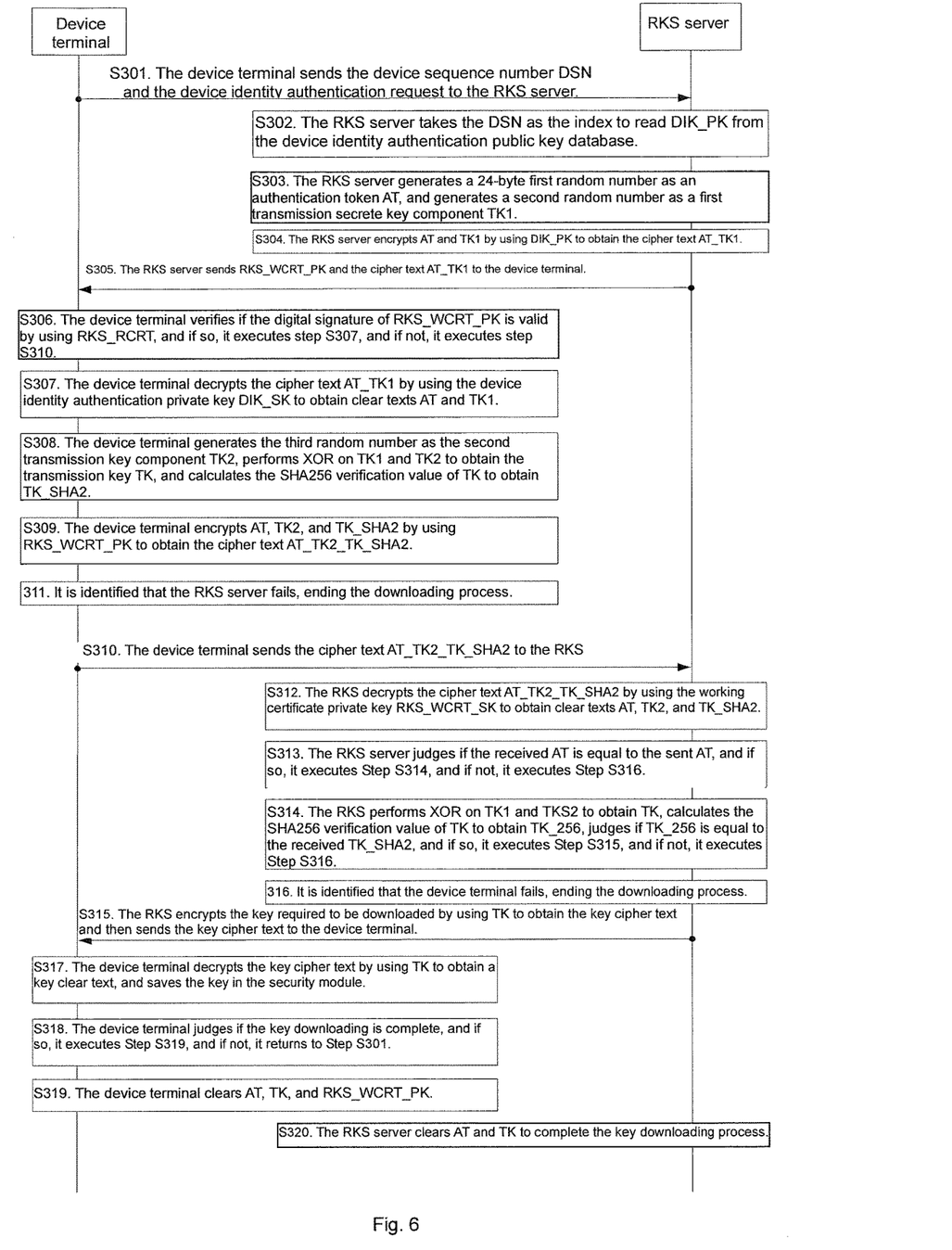
FIG. 6 is a flowchart of a key downloading management method in embodiment 1 of the present invention.

Refer to FIG. 6, which is a flowchart of a key downloading management method in embodiment 1 of the present invention. The key downloading management method operates in the key downloading management system. The method is carried out as follows:

Step S301. The device terminal sends the device sequence number DSN and the device identity authentication request to the RKS server.

Step 302. The RKS server takes the DSN as the index to read the corresponding device identity authentication public key DIK_PK from the device identity authentication public key database.

Step 303. The RKS server generates a 24-byte first random number as an authentication token AT, and generates a second random number as a first transmission secrete key component TK1.

Step 304. The RKS server encrypts AT and TK1 by using DIK_PK to obtain the cipher text AT_TK1.

Step 3205. The RKS server sends the working certificate public key RKS_WCRT_PK and the cipher text AT_TK1 to the device terminal.

Step S306. The device terminal verifies if the digital signature of RKS_WCRT_PK is valid by using the root public key certificate RKS_RCRT, and if so, it executes step S307, and if not, it executes step S311.

Step S307. The device terminal decrypts the cipher text AT_TK1 by using the device identity authentication private key DIK_SK to obtain clear texts AT and TK1, wherein DIK_PK and DIK_SK form a non-symmetric key pair.

Step S308. The device terminal generates the third random number as the second transmission key component TK2, performs XOR on TK1 and TK2 to obtain the transmission key TK, and calculates the SHA256 verification value of TK to obtain TK_SHA2.

Step S309. The device terminal encrypts AT, TK2, and TK_SHA2 by using RKS_WCRT_PK to obtain the cipher text AT_TK2_TK_SHA2.

Step S310. The device terminal sends the cipher text AT_TK2_TK_SHA2 to the RKS server.

Step 311. It is identified that the RKS server fails, ending the downloading process.

Step S312. The RKS decrypts the cipher text AT_TK2_TK_SHA2 by using the working certificate private key RKS_WCRT_SK to obtain clear texts AT, TK2, and TK_SHA2, wherein RKS_WCRT_PK and RKS_WCRT_SK form a non-symmetric key pair.

Step S313. The RKS server judges if the received AT is equal to the sent AT, and if so, it executes Step S314, and if not, it executes Step S316.

Step S314. The RKS performs XOR on TK1 and TK2 to obtain TK, calculates the SHA256 verification value of TK to obtain TK_256, judges if TK_256 is equal to the received TK_SHA2, and if so, it executes Step S315, and if not, it executes Step S316.

Step S315. The RKS encrypts the key required to be downloaded by using TK to obtain the key cipher text and then sends the key cipher text to the device terminal.

Step 316. It is identified that the device terminal fails, ending the downloading process.

Step S317. The device terminal decrypts the key cipher text by using TK to obtain a key clear text, and saves the key in the security module.

Step S318. The device terminal judges if the key downloading is complete, and if so, it executes Step S319, and if not, it returns to Step S301.

Step S319. The device terminal clears AT, TK, and RKS_WCRT_PK.

Step S320. The RKS server clears AT and TK to complete the key downloading process.

The key downloading method, management method, downloading management method, device, and system of the present invention realize that the device terminal remotely downloads the master keys from the RKS server, thus avoiding a situation where the device terminal needs to download the master keys in a concentrated way and then release the master keys to the merchants; after delivery, the device terminals can be directly distributed to the deployed sites, avoiding a situation where the device terminals need to be concentrated to a certain fixed machine room to download the keys and then distribute them to the deployed sites.

The non-symmetric key management technology is employed to realize bidirectional valid identification authentication, ensuring the identity validity of the RKS server and the device terminal; the device terminal authenticates the validity of the RKS server through verifying the digital signature of the working certificate pubic key of the RKS server; the RKS server generates an authentication token AT, encrypts the AT by using the device identity authentication public key of the device terminal and then the feeds the cipher text to the device terminal; the device terminal decrypts the cipher text by using the device identity authentication private key, then encrypts the AT by using the working certificate public key, and then feeds the encrypted AT to the key server; the key server decrypts the AT by using its working certificate public key and then compares if the decrypted TA is consistent with the generated authentication token AT; and if so, this means that the POS terminal of the device is valid, thus realizing the bidirectional identity authentication.

Randomly generated symmetric keys are employed to protect the downloaded keys; the TMK transmitted on a line is encrypted by a temporary transmission key; the transmission key consists of a component generated by the POS terminal and a component generated by the key server, and is transmitted to the opposite party after being encrypted by using the public key of the opposite party, thus realizing synchronization of the temporary transmission keys and enhancing the security and efficiency of TMK transmission.

The above are only some embodiments of the present invention and shall not be regarded as limits to the present invention. Any equivalent structure or equivalent flow modifications made on the basis of the description and attached drawings of the present invention, or direct or indirect application to other related fields, shall fall within the protective scope of the present invention.

What is claimed is:

1. A key downloading method, comprising:
    sending a device sequence number DSN and a device identity authentication request to a remote key system (RKS) server via a device terminal;
    receiving a working certificate public key RKS_W-CRT_PK and a cipher text AT_TK1 sent by the RKS server, via the device terminal, wherein the AT_TK1 cipher text is obtained by encrypting an authentication token AT and a first transmission key component TK1 by using a device identity authentication pubic key DIK_PK;
    verifying if a digital signature of RKS_WCRT_PK is valid by using a root public key certificate RKS_RCRT, and if valid, decrypting the AT_TK1 cipher text by using a device identity authentication private key DIK_SK to obtain clear texts AT and TK1, via the device terminal, wherein DIK_PK and DIK_SK form a non-symmetric key pair;
    generating a third random number as a second transmission key component TK2, performing XOR on TK1 and TK2 to obtain a transmission key TK, calculating SHA256 verification value of TK to obtain TK_SHA2, via the device terminal;
    encrypting AT, TK2, and TK_SHA2 by using RKS_W-CRT_PK to obtain a cipher text AT_TK2_TK_SHA2 and sending the cipher text AT_TK2_TK_SHA2 to the RKS server, via the device terminal;
    receiving a key cipher text sent by the RKS server via the device terminal, wherein the key cipher text is obtained through encrypting the key to be downloaded by TK;
    decrypting the key cipher text by using TK to obtain a key clear text, storing the key in a security module, via the device terminal; and
    judging if the key downloading is complete, and if complete, clearing AT, TK, and RKS_WCRT_PK, via the device terminal.

2. A key management method, comprising:
    receiving a device sequence number DSN and a device identity authentication request sent from at least one device terminal via a remote key system (RKS), server;
    taking the DSN as an index to read a corresponding device identity authentication public key DIK_PK from a device identity authentication public key database by the RKS server;
    generating a 24-byte first random number as an authentication token AT and generating a second random number as a first transmission key component TK1 by the RKS server;
    encrypting AT and TK1 by using DIK_PK to obtain a cipher text AT_TK1 by the RKS server;
    sending a working certificate public key RKS_W-CRT_PK and the cipher text AT_TK1 to the device terminal by the RKS server;
    receiving a cipher text AT_TK2_TK_SHA2 sent from the device terminal by the RKS server, wherein the cipher text AT_TK2_TK_SHA2 is obtained through encrypting AT, a second transmission key component TK2 and TK_SHA2 by the RKS_WCRT_PK, TK_SHA2 is the SHA256 verification value of a transmission key TK, TK is obtained through performing XOR on TK1 and TK2;
    decrypting the cipher text AT_TK2_TK_SHA2 by using a working certificate private key to obtain clear texts AT, TK2, and TK_SHA2 by the RKS server, wherein RKS_WCRT_PK and RKS_WCRT_SK form a non-symmetric key pair;
    judging if the received AT is equal to the sent AT, and if so, performing XOR on TK1 and TK2 to obtain TK, calculating the SHA256 verification value of TK to obtain TK_256, by the RKS server;
    judging if TK_256 is equal to the received TK_SHA2, and if so, encrypting a key required to be downloaded by using TK to obtain a key cipher text, by the RKS server;
    sending the key cipher text to the device terminal by the RKS server; and
    clearing AT and TK by the RKS server to complete the key downloading process.

3. A key downloading management method, comprising:
    sending a device sequence number DSN and a device identity authentication request to a remote key system (RKS) server via a device terminal;

taking the DSN as an index to read a corresponding device identity authentication public key DIK_PK from a device identity authentication public key database by the RKS server;

generating a 24-byte first random number as an authentication token AT and generating a second random number as a first transmission key component TK1 by the RKS server;

encrypting AT and TK1 by using DIK_PK to obtain a cipher text AT_TK1 by the RKS server;

sending a working certificate public key RKS_WCRT_PK and the cipher text AT_TK1 to the device terminal by the RKS server;

verifying if a digital signature of RKS_WCRT_PK is valid by using a root public key certificate RKS_RCRT, and if valid, decrypting the AT_TK1 cipher text by using a device identity authentication private key DIK_SK to obtain clear texts AT and TK1, via the device terminal, wherein DIK_PK and DIK_SK form a non-symmetric key pair;

generating a third random number as a second transmission key component TK2, performing XOR on TK1 and TK2 to obtain a transmission key TK, calculating SHA256 verification value of TK to obtain TK_SHA2, via the device terminal;

encrypting AT, TK2, and TK_SHA2 by using RKS_WCRT_PK to obtain a cipher text AT_TK2_TK_SHA2 and sending the cipher text AT_TK2_TK_SHA2 to the RKS server, via the device terminal;

decrypting the cipher text AT_TK2_TK_SHA2 by using a working certificate private key to obtain clear texts AT, TK2, and TK_SHA2 by the RKS server, wherein RKS_WCRT_PK and RKS_WCRT_SK form a non-symmetric key pair;

judging if the received AT is equal to the sent AT, and if so, performing XOR on TK1 and TK2 to obtain TK, calculating the SHA256 verification value of TK to obtain TK_256, by the RKS server; judging if TK_256 is equal to the received TK_SHA2, and if so, encrypting a key required to be downloaded by using TK to obtain a key cipher text and sending the key cipher text to the device terminal, via the RKS server;

decrypting the key cipher text by using TK to obtain a key clear text, storing the key in a security module, via the device terminal;

judging if the key downloading is complete, and if complete, clearing AT, TK, and RKS_WCRT_PK, via the device terminal; and clearing AT and TK by the RKS server to complete the key downloading process.

4. A key downloading device, comprising:

an authentication request sending unit for sending a device sequence number DSN and a device identity authentication request to a remote key system (RKS) server;

a first receiving unit for receiving a working certificate public key RKS_WCRT_PK and a cipher text AT_TK1 sent by the RKS server, wherein the cipher text AT_TK1 is obtained by encrypting an authentication token AT and a first transmission key component TK1 by using a device identity authentication pubic key DIK_PK;

a server identity verifying unit for verifying if a digital signature of RKS_WCRT_PK is valid by using a root public key certificate RKS_RCRT;

a first decrypting unit for decrypting the cipher text AT_TK1 by using a device identity authentication private key DIK_SK to obtain clear texts AT and TK1 when the server identity verifying unit verifies that the digital signature is valid, wherein DIK_PK and DIK_SK form a non-symmetric key pair;

a second transmission key component generating unit for generating a third random number as the second transmission key component TK2;

a first transmission key computation unit for performing XOR on TK1 and TK2 to obtain a transmission key TK and calculating SHA256 verification value of TK to obtain TK_SHA2;

a first encrypting unit for encrypting AT, TK2, and TK_SHA2 by using RKS_WCRT_PK to obtain a cipher text AT_TK2_TK_SHA2;

a first sending unit for sending the cipher text AT_TK2_TK_SHA2 to the RKS server;

a second receiving unit for receiving a key cipher text sent by the RKS server, wherein the key cipher text is obtained through encrypting a key to be downloaded by TK;

a second decrypting unit for decrypting the key cipher text by using TK to obtain a key clear text;

a key downloading unit for storing the key in a security module; and a first clearing unit for judging if the key downloading is complete, and when the downloading is complete, clearing AT, TK, and RKS_WCRT_PK.

5. A key management device, comprising:

an authentication request receiving unit for receiving a device sequence number DSN and a device identity authentication request sent from at least one device terminal;

a device identity authentication unit for taking the DSN as an index to read a corresponding device identity authentication public key DIK_PK from a device identity authentication public key database;

an authentication token generating unit for generating a 24-byte first random number as an authentication token AT;

a first transmission key generating unit for generating a second random number as a first transmission key component TK1;

a second encrypting unit for encrypting AT and TK1 by using DIK_PK to obtain a cipher text AT_TK1;

a second sending unit for sending a working certificate public key RKS_WCRT_PK and the cipher text AT_TK1 to the device terminal;

a third receiving unit for receiving a cipher text AT_TK2_TK_SHA2 sent from the device terminal, wherein the cipher text AT_TK2_TK_SHA2 is obtained through encrypting AT, a second transmission key component TK2 and TK_SHA2 by the RKS_WCRT_PK, TK_SHA2 is the SHA256 verification value of a transmission key TK, TK is obtained through performing XOR on TK1 and TK2;

a third decrypting unit for decrypting the cipher text AT_TK2_TK_SHA2 by using the working certificate private key to obtain clear texts AT, TK2 and TK_SHA2, wherein RKS_WCRT_PK and RKS_WCRT_SK form a non-symmetric key pair;

an authentication token verifying unit for judging if the received AT is equal to the sent AT;

a second transmission key computation unit for performing XOR on TK1 and TK2 to obtain TK when judging that the received AT is equal to the sent AT, and calculating the SHA256 verification value of TK to obtain TK_256;

a transmission key verifying unit for judging if TK_256 generated by the second transmission key computation unit is equal to the received TK_SHA2;

a third encrypting unit for encrypting a key required to be downloaded by using TK to obtain a key cipher text when the transmission key verifying unit judges that the TK generated by the second transmission key computation unit is equal to the received TK_SHA2;

a third sending unit for sending the key cipher text to the device terminal; and a second clearing unit for clearing AT and TK to complete the key downloading process.

6. A key downloading management system, comprising a remote key system (RKS) server and at least one device terminal in communication connection with the RKS server; wherein:

the RKS server comprises: a key management device, the key management device comprising:

an authentication request receiving unit for receiving a device sequence number DSN and a device identity authentication request sent from at least one device terminal;

a device identity authentication unit for taking the DSN as an index to read a corresponding device identity authentication public key DIK_PK from a device identity authentication public key database;

an authentication token generating unit for generating a 24-byte first random number as an authentication token AT;

a first transmission key generating unit for generating a second random number as a first transmission key component TK1;

a second encrypting unit for encrypting AT and TK1 by using DIK_PK to obtain a cipher text AT_TK1;

a second sending unit for sending a working certificate public key RKS_WCRT_PK and the cipher text AT_TK1 to the device terminal;

a third receiving unit for receiving a cipher text AT_TK2_TK_SHA2 sent from the device terminal, wherein the cipher text AT_TK2_TK_SHA2 is obtained through encrypting AT, the second transmission key component TK2 and TK_SHA2 by the RKS_WCRT_PK, TK_SHA2 is the SHA256 verification value of a transmission key TK, TK is obtained through performing XOR on TK1 and TK2;

a third decrypting unit for decrypting the cipher text AT_TK2_TK_SHA2 by using a working certificate private key to obtain clear texts AT, TK2 and TK_SHA2, wherein RKS_WCRT_PK and RKS_WCRT_SK form a non-symmetric key pair;

an authentication token verifying unit for judging if the received AT is equal to the sent AT;

a second transmission key computation unit for performing XOR on TK1 and TK2 to obtain TK when judging that the received AT is equal to the sent AT, and calculating the SHA256 verification value of TK to obtain TK_256;

a transmission key verifying unit for judging if TK_256 generated by the second transmission key computation unit is equal to the received TK_SHA2;

a third encrypting unit for encrypting a key required to be downloaded by using TK to obtain a key cipher text when the transmission key verifying unit judges that the TK generated by the second transmission key computation unit is equal to the received TK_SHA2;

a third sending unit for sending the key cipher text to the device terminal; and a second clearing unit for clearing AT and TK to complete the key downloading process; and the at least one device terminal comprising a key downloading device;

the key downloading device comprising:

an authentication request sending unit for sending a device sequence number DSN and a device identity authentication request to the RKS server;

a first receiving unit for receiving a working certificate public key RKS_WCRT_PK and a cipher text AT_TK1 sent by the RKS server, wherein the cipher text AT_TK1 is obtained by encrypting an authentication token AT and a first transmission key component TK1 by using a device identity authentication pubic key DIK_PK;

a server identity verifying unit for verifying if a digital signature of RKS_WCRT_PK is valid by using a root public key certificate RKS_RCRT;

a first decrypting unit for decrypting the cipher text AT_TK1 by using a device identity authentication private key DIK_SK to obtain clear texts AT and TK1 when the server identity verifying unit verifies that the digital signature is valid, wherein DIK_PK and DIK_SK form a non-symmetric key pair;

a second transmission key component generating unit for generating a third random number as the second transmission key component TK2;

a first transmission key computation unit for performing XOR on TK1 and TK2 to obtain a transmission key TK and calculating SHA256 verification value of TK to obtain TK_SHA2;

a first encrypting unit for encrypting AT, TK2, and TK_SHA2 by using RKS_WCRT_PK to obtain a cipher text AT_TK2_TK_SHA2;

a first sending unit for sending the cipher text AT_TK2_TK_SHA2 to the RKS server;

a second receiving unit for receiving a key cipher text sent by the RKS server, wherein the key cipher text is obtained through encrypting the key to be downloaded by TK;

a second decrypting unit for decrypting the key cipher text by using TK to obtain a key clear text;

a key downloading unit for storing the key in a security module; and a first clearing unit for judging if the key downloading is complete, and when the downloading is complete, clearing AT, TK, and RKS_WCRT_PK.

* * * * *